United States Patent [19]
Stallard et al.

[11] Patent Number: 5,350,270
[45] Date of Patent: Sep. 27, 1994

[54] PICKFACE CONVEYOR

[75] Inventors: David W. Stallard, Grand Rapids; John P. Conner, Grandville, both of Mich.

[73] Assignee: Qube, Inc., Grand Rapids, Mich.

[21] Appl. No.: 774,070

[22] Filed: Oct. 9, 1991

[51] Int. Cl.⁵ ............................................. B65G 1/08
[52] U.S. Cl. .................................. 414/276; 414/286; 414/399; 211/151
[58] Field of Search ............. 254/10 R; 414/277, 279, 414/286, 498, 917, 495, 389, 399, 276; 211/151, 162

[56] References Cited

U.S. PATENT DOCUMENTS

| | | | |
|---|---|---|---|
| 3,809,268 | 5/1974 | Lutz | 414/495 X |
| 4,715,765 | 12/1987 | Agnoff | 414/286 X |
| 4,925,357 | 5/1990 | Cisternino et al. | 414/495 |
| 4,936,738 | 6/1990 | Brennan et al. | 414/276 X |
| 4,972,778 | 11/1990 | Suominen | 414/277 X |
| 5,020,961 | 6/1991 | Maki-Rahkola et al. | 414/495 |
| 5,170,896 | 12/1992 | Konstant | 211/151 |

*Primary Examiner*—Michael S. Huppert
*Assistant Examiner*—Stephen Gordon
*Attorney, Agent, or Firm*—Price, Heneveld, Cooper, DeWitt & Litton

[57] ABSTRACT

A pickface conveyor including two or three load storage stations and including a trolley movably positioned on an inclined track. A first load support is shiftable vertically about an over center linkage to facilitate the transfer of loads from the first load support to a second load support. The first load support can be positioned at the first station with the second load support comprising the trolley, or the first load support can be mounted on the trolley with the second load support comprising the second station.

24 Claims, 7 Drawing Sheets

PICKFACE CONVEYOR

BACKGROUND OF THE INVENTION

The present invention relates to material handling devices for advancing palletized loads from a first station to a second station, and sometimes onto subsequent stations. Many food and general merchandise distribution centers throughout the world have installed pickface conveyor flow rails to hold and advance palletized loads in two-deep or three-deep configurations. In such installations, load support rails with built-in top rollers are often positioned on an incline so that the force of gravity can be used to move pallets forward on the rollers. As the user removes an empty pallet from the rail, the succeeding pallet or pallets move forwardly on the rails through the force of gravity.

This arrangement often makes it difficult and dangerous to remove the empty pallet from the pickface position, due to the line pressure of the second and perhaps third pallets on the empty pallet. When the first or empty pallet has been removed, the speed acquired by the advancing pallets frequently represents a danger both to the selection employee and to the product, which may easily fall off of the pallet due to the impact stop when the pallet reaches the pickface position.

In some installations, these dangers are avoided by the installation of nearly level roller support rails. This requires the selector employee to pull the reserve pallet or pallets forward manually. This task can become quite difficult, especially when the pallet is missing a bottom board, has a broken bottom board or has a soft wood bottom board. Back strain frequently occurs.

These problems could be obviated by replacing the roller support rails with an electric trolley of the type used in deep lane storage facilities. In such facilities, an electric trolley moves into position beneath a load, electronically activates an elevator to lift the load off of its supports, transfers the load to another location and electrically activates the elevator to lower the load onto new supports in the second location. However, the use of such technology in pickface applications where at most only a few storage positions are involved is simply uneconomical. The equipment involved is too sophisticated for the application.

It is an object of the present invention to eliminate these difficulties with a simple, straightforward and efficient mechanism.

SUMMARY OF THE INVENTION

In the present invention, a first load support is mounted by a pivotal linkage to a base which facilitates shifting of the first load support between first and second vertical positions relative to the base. In the broader aspects of the invention, the base can comprise either a trolley wheel frame or a trolley track at a first station, the track extending from the first station to a second station. When the base comprises a trolley wheel frame, a second load support is mounted on the track at the second station. With this arrangement of parts, a first activating means shifts the first load support into its first vertical position at the first station, which is above the level of the second load support. In this position, a load is placed on the first load support and the trolley is advanced to the second station where a second activating means shifts the first load support into its second vertical position which is below the level of the second load support, thereby depositing the load on the second load support at the second station.

In the alternative configuration contemplated by the broader aspects of the invention, where the base comprises the trolley track at the first position, the second load support comprises the trolley itself. With the first load support in its first vertical position, above the level of the second load support, a load can be placed on the first load support. The trolley can then be conveyed into position beneath the load at the first station and the second activating means can be activated to shift the first load support into the second vertical position thereby lowering the load onto the second load support, which is the trolley itself. The trolley then conveys the load into the second station and the first activating means shifts the first load support back into its first vertical position where it can receive another load.

These and other features, objects and advantages of the invention will be more fully understood and appreciated by reference to the written specification and appended drawings.

DESCRIPTION OF THE PREFERRED EMBODIMENT

Figure 1:
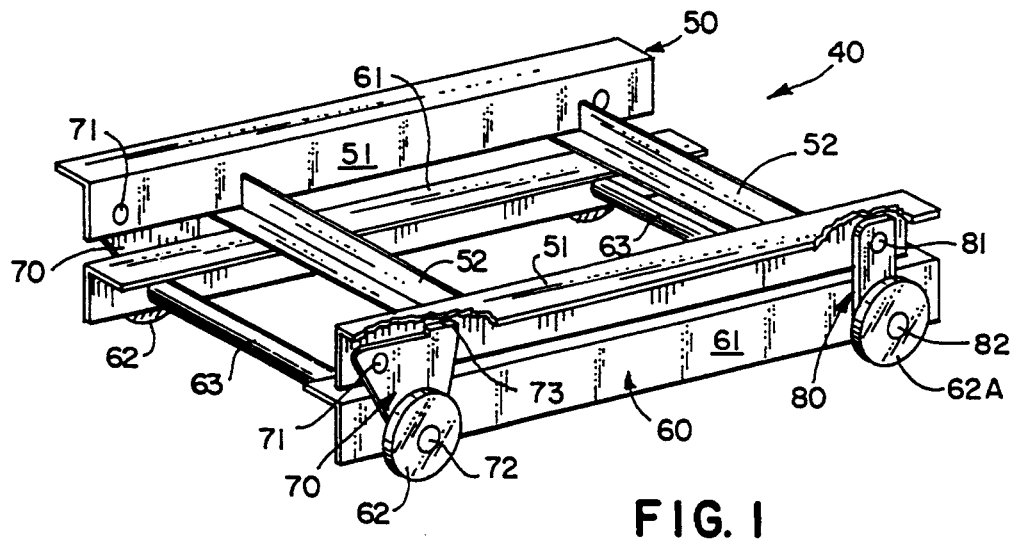
FIG. 1 is a perspective view of a trolley made in accordance with the present invention and including a first load support.
Figure 2:
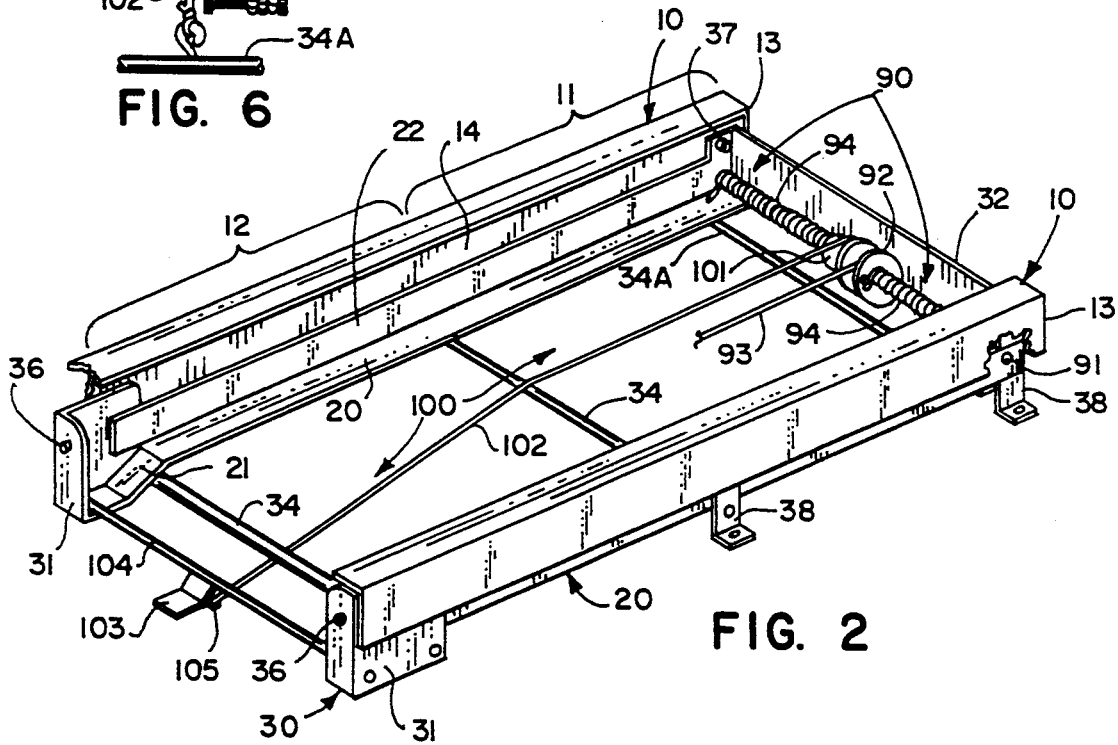
FIG. 2 is a perspective view of a load support rail and track assembly upon which the trolley is movably mounted, wherein the load support rails comprise the second load support.
Figure 3:
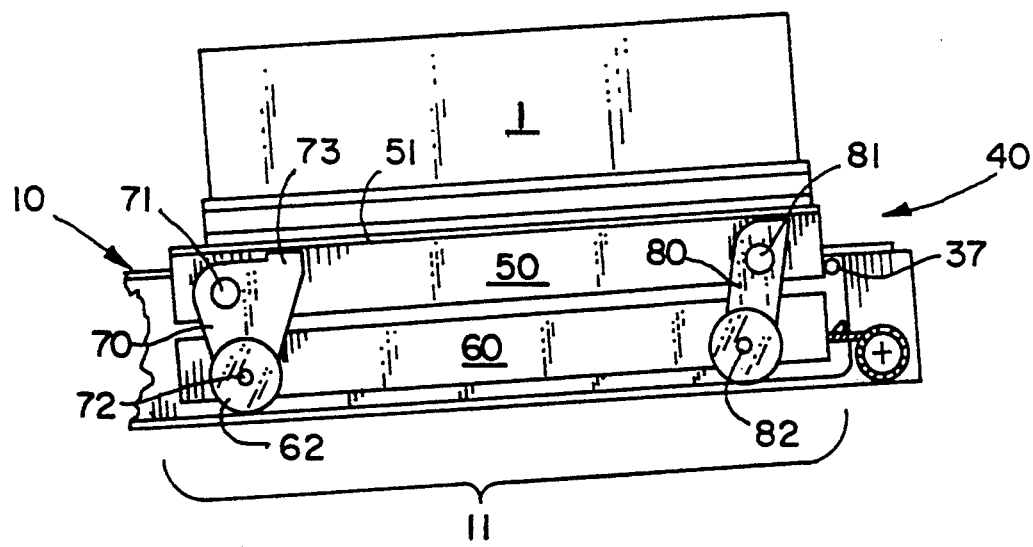
FIG. 3 is a side elevational view of the trolley in its first load storing station at the rear of the load support rail and track assembly.
Figure 4:
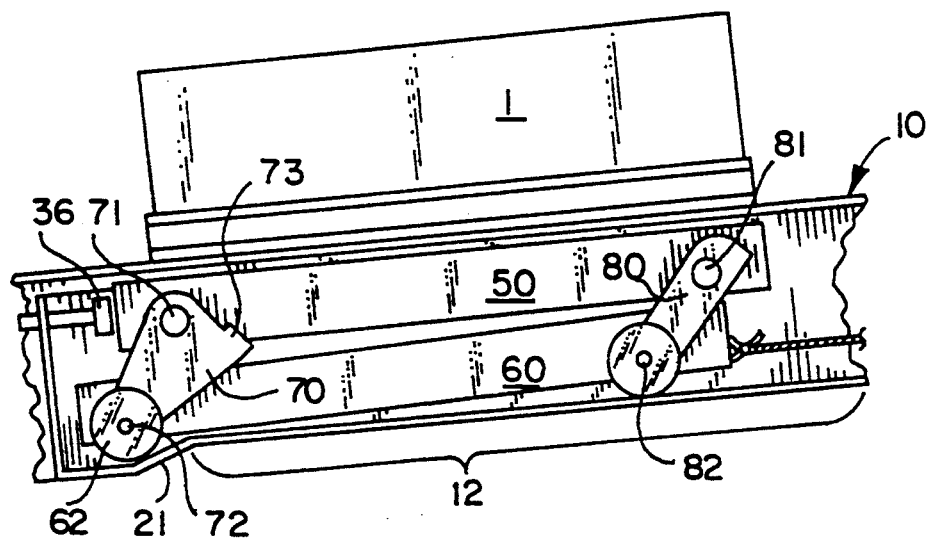
FIG. 4 is a side elevational view of the trolley after it has advanced to its second load storing station.

In the preferred embodiment, trolley 40 (FIG. 1) comprises a first load support frame 50 elevatably mounted to a wheel frame 60 which serves as a base for frame 50, through an over center linkage 70 and secondary linkage assembly 80. Trolley 40 is movably mounted on tracks 20 (FIG. 2) which are located between and extend parallel to a pair of spaced load support rails 10, between first and second load storing stations 11 and 12. A return assembly 90 causes trolley 40 to return to the first storage station 11 along the length of load support rails 10, where support frame 50 is shifted about said over center linkage 70 thereby elevating load support frame 50 relative to wheel frame 60. In this elevated position, frame 50 holds a load 1 placed thereon above the level of load support rails 10 (FIG. 3). The load is placed on trolley 40 after support frame 50 has been elevated. Release of brake assembly 100 (FIG. 2) allows trolley 40 to roll along tracks 20 to the second storage station 12 on load support rails 10 where load support frame 50 is shifted back over said over center linkage 70 such that it is caused to drop relative to wheel frame 60, thereby depositing load 1 atop load support rails 10 at second station 12 (FIG. 4). Trolley 40 is returned in that condition back to first storage station 11 (FIG. 5), where support frame 50 is again elevated in the manner described above so that it is ready to receive another load placed thereon.

Each load support rail 10 is constructed of sturdy steel of a right angle, cross-sectional configuration, so as to define vertical sidewalls 14. End caps 13 are formed or welded at each end of rail 10 to give additional strength and reinforcement to load support rails 10. As shown, rails 10 are about twice as long as the length of trolley 40 so as to define a first load storing station 11 and a second load storing station 12, between which trolley 40 shuttles. Load storage station 11 is the "loading position" for trolley 40, and station 12 is the "unloading position" where trolley 40 unloads its load. However, load support rails 10 are not actually needed at first load storing station 11, since at station 11 a load 1 is always loaded onto and supported by trolley 40 with first load support frame 50 in its elevated position.

Tracks 20 are similarly formed of a sturdy steel and include a downwardly inclined, forward ramp portion 21 near the end thereof which is located towards second storage station 12 of storage rails 10. While in the broader aspects of the invention trolley 40 could be moved by an operator either manually or using auxiliary power along the length of track 20, it is preferable that track 20 is inclined slightly so that gravity provides the motive power. Each track 20 is preferably formed in an angled cross-sectional configuration so as to include upstanding side members 22 (FIG. 2). However in the broader aspects of the invention, any floor could provide the track for trolley 40.

The degree of incline of tracks 20 is a function of the type of wheel selected for trolley 40. If steel wheels are used on a steel track, the incline will be approximately one-half inch in ten feet. If a wheel of a polymeric material such as Adaprene ™ is used, the degree of incline required will be about one inch in ten feet.

Load support rails 10 and tracks 20 are mounted on a track and rail support frame 30 which includes forward corner brackets 31 configured of sturdy steel (FIG. 2). A back bracket 32 is located at the opposite end of frame 30 and extends completely across the back thereof. Back bracket 32 is joined to forward corner brackets 31 by the sidewalls 22 of tracks 20 and by the sidewalls 14 of load support rails 10. Several cross pieces 34 at spaced intervals along the length of frame 30 further rigidify the entire assembly. Although load support rails 10 are shown parallel to tracks 20 such that they, like tracks 20, are inclined at a slight angle, it would be preferred that load support rails 10 be generally horizontal. However, it may not cause a problem to have support rails 10 oriented parallel to inclined tracks 20 if the degree of incline required is very slight, e.g., one-half inch in ten feet.

Forward trolley stops 36 are mounted on each forward corner bracket 31 and rear trolley stops 37 are mounted near back bracket 32, generally on either side of frame 30. Mounting feet 38 facilitate proper mounting of track and rail support frame 30.

Load support frame 50 of trolley 40 comprises a pair of steel angle side frame members 51 joined by at least two frame cross members 52. The entire assembly is preferably of steel. Load support frame 50 is shown oriented generally parallel to wheel frame 60 and to the slightly inclined tracks 20. As above in connection with support rails 10, it is preferred that load support frame 50 be oriented generally horizontally. However, introduction of this subtlety into the drawings might confuse understanding of the basic principle of the invention.

Wheel frame 60 includes a pair of spaced steel angle frame sides 61 joined by cross members 63. A pair of wheels 62 are located fore and aft on each frame side member 61.

An over center linkage 70 is pivotally joined at a first pivot point 71 to load support frame 50 towards the forward end of each side member 51. It is joined at its other end by a second pivot 72, which corresponds to the axle of wheel 62, to the frame side member 61 of wheel frame 60, near the forward end thereof. Linkage 70 pivots such that first pivot point 71 shifts fore and aft of second pivot point 72, relative to the line of gravity passing through second pivot 72.

Secondary linkage 80 is similar, being secured at a first pivot 81 near the rear of side member 51 of load support frame 50 and being secured at a second pivot 82, also corresponding to an axle of a wheel 62A, near the rear of side member 61 of wheel frame 60. It is not as important that secondary linkage 80 be an "over center" linkage, though when trolley 40 is in its loading position 11, it is preferable that first pivot 81 lie generally along the line of gravity passing through second pivot 82.

Each over center linkage 70 includes a first vertical stop 73 which limits the vertical movement of load support frame 50 as first pivot 71 shifts forwardly relative to second pivot 72 (FIG. 3). First vertical stop 73 comprises an ear or tab which engages the underside of load support frame side member 51. This stop action holds sides 51 of load support frame 50 in a position elevated above the level of load support rails 10 (FIG. 3). With pivot point 71 shifted forwardly of pivot point 72, load support frame 50 is biased into the position shown in FIG. 3, with first stop 73 engaging the underside side rail 51.

Figure 5:
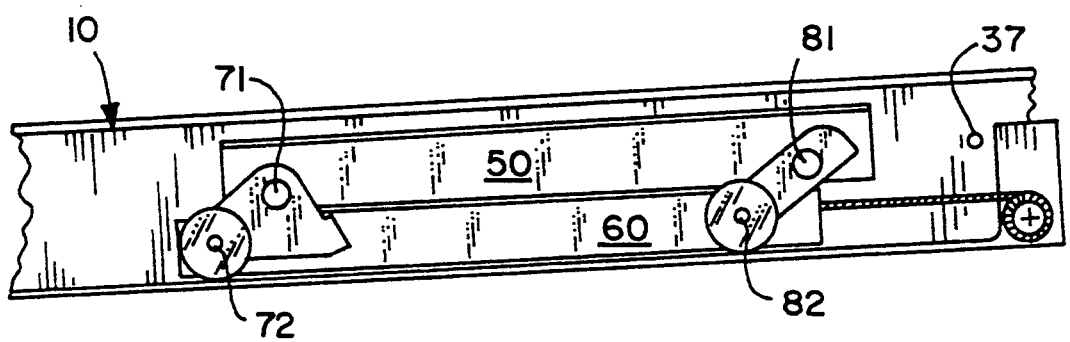
FIG. 5 is a side elevational, partially cross-sectional view of the trolley being returned to its first load storing station.

As pivot point 71 is shifted to the rear of pivot point 72 as shown in FIG. 5, load support frame 50 is free to pivot vertically downwardly relative to wheel frame 60 until it comes to rest atop wheel frame 60. In this respect, wheel frame 60 serves as a second stop limiting vertical movement of load support frame 50, this time in a position such that load support frame 50 is located below the level of load support rails 10.

Figure 6:
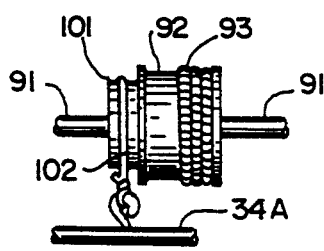
FIG. 6 is an elevational view of the rewind spool and brake drum of the track and load support rail assembly.

The movement of trolley 40 is controlled in the first instance by trolley return assembly 90 (FIGS. 2 and 6).

Trolley return assembly 90 comprises an axle 91 upon which is mounted a rewind spool 92 and a pair of torsion springs 94, one located to each side of rewind spool 92. A trolley cable 93 is wound on spool 92 and is connected at one end to trolley 40. As trolley 40 advances with its load 1, under the force of gravity, torsion springs 94 are wound tightly about axle 91. When trolley 40 is unloaded at unload position 12, torsion springs 94 are free to uncoil, thereby rewinding trolley cable 93 on spool 92 and withdrawing trolley 40 to loading station 11.

The movement of trolley 40 is also controlled by brake assembly 100. Brake assembly 100 comprises a brake drum 101 positioned adjacent and connected to rewind spool 92 on axle 91 (FIGS. 2 and 6) and a brake cable 102 which is wrapped over brake drum 101 and is secured at one end to end cross brace 34A of frame 30 and at the other end to a brake release pedal 103. Brake release pedal 103 is rigidly mounted on a spring loaded pedal pivot axle 104 such that as brake release pedal 103 is depressed, the downwardly depending brake cable level mount 105 to which brake cable 102 is secured rocks rearwardly, thereby releasing the tension on brake cable 102. This in turn eases friction on brake drum 101 and allows spool 92 to rotate, trolley cable 93 to unwind from spool 92 and trolley 40 to advance from load position 11 to unload position 12. Brake assembly 100 is a one-way brake in that as spool 92 is rotated so as to rewind trolley cable 93, any friction between brake cable 102 and brake drum 101 tends to be released as brake cable 102 pulls brake pedal lever 105 rearwardly.

OPERATION

In operation, an operator, typically using a lift truck, places a load 1 atop trolley 40 with support frame 50 in its elevated position (FIG. 3). Trolley 40 and load 1 are at this point located at first storage station 11, which can also be thought of as the "loading" station.

After a previously placed load has been removed from second station position 12, an operator depresses brake lever 103, thereby releasing tension on brake drum 101. The weight of load 1 on trolley 40 then causes trolley 40 to gradually roll along slightly inclined track 20. As it does so, cable 93 begins to unwind from drum 92 and torsion springs 94 begin to tighten around axle 91 (FIG. 2). When trolley 40 reaches second storage station 12, which can be thought of as the "unloading station," stops 36 engage load support frame 50 preventing any further forward movement thereof (FIG. 4). At this point, the lead wheels 62 of trolley 60 are on the upper part of inclined track portion 21, which is inclined at a slightly greater incline than the balance of track 20. The slightly greater incline of track portion 21 effectively shifts lower pivot axis 72 forwardly of pivot point 71, thereby allowing forward wheels 62 to continue rolling down ramps 21, thus pivoting link member 70 and allowing load support frame 50 to settle downwardly on top of wheel frame 60 (FIG. 4). Load 1 is thus lowered into position on load support rails 10 at load storage position 12. Load 1 can now be readily removed from load storage position 1 in the manner which is typical for "pickface" storage applications.

As the load comes off of load support frame 50, the tension in torsion springs 94 begins to rewind cable 93 on drum 92. This withdraws trolley 40 to loading station 11. As trolley 40 approaches loading station 11, support frame 50 engages rear stops 37. Wheel frame 60 is free to continue its rearward movement. This pivots links 70 and 80, shifting pivot 71 ahead of pivot 72, thus elevating support 50 until stops 73 abut flanges of frame members 51 of support 50. Support 50 is now elevated above the level of load support rails 10, ready to receive another load.

Figure 8:
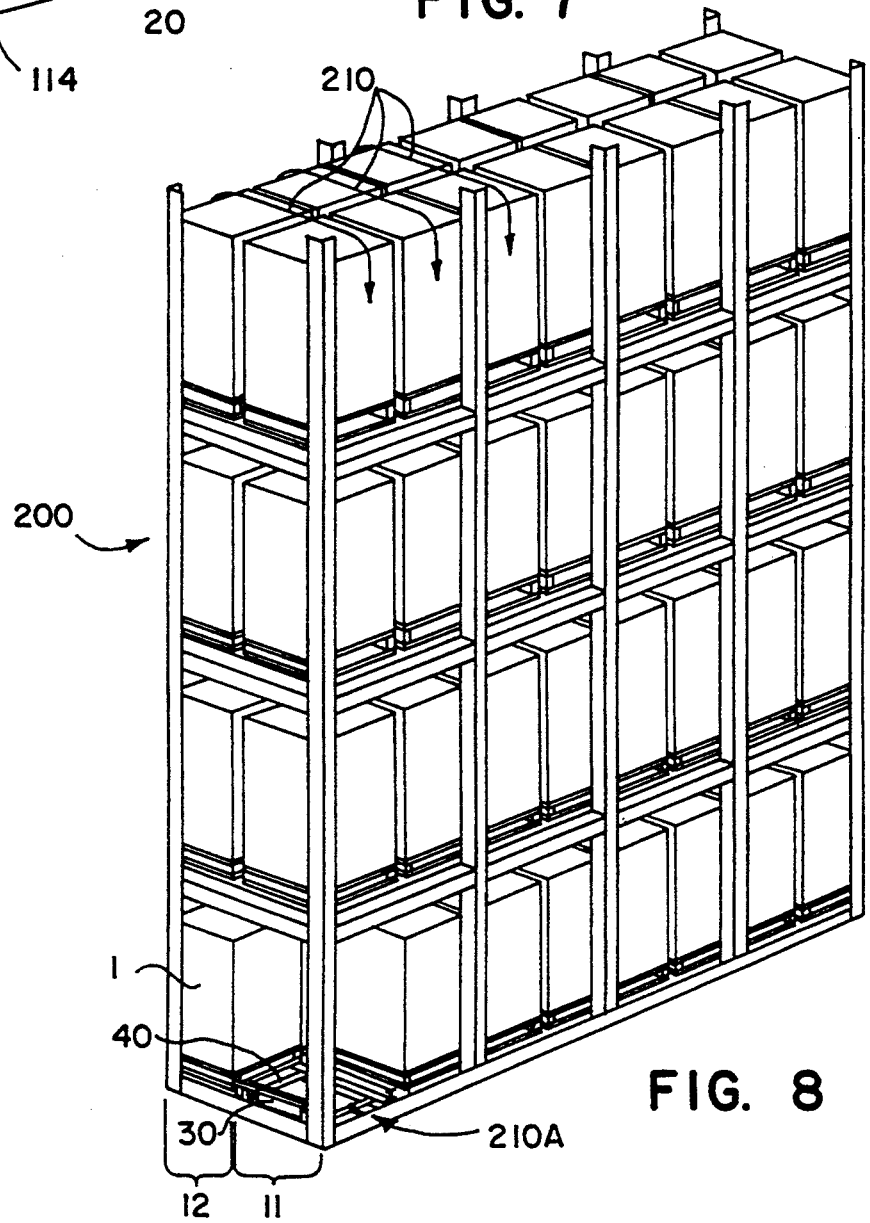
FIG. 8 is a perspective view of a storage system illustrating the manner in which the device of the present invention can be used.

A "pickface" stack 200 is shown in FIG. 8. Stack 200 comprises a plurality of two storage positions 210, arranged in several levels. A track and load support frame 30 is located at one or more of stations 210, typically though not necessarily at ground level, along with a trolley 40, to create a pickface station 210A. Loads 1 are thus loaded onto the various trolleys in their loading or first storage position 11 at each of the various pickface stations 210A. Each load 1 is advanced to second storage position 12 as the previous load and its supporting pallet have been removed.

ALTERNATIVE EMBODIMENT BRAKE

Figure 7:
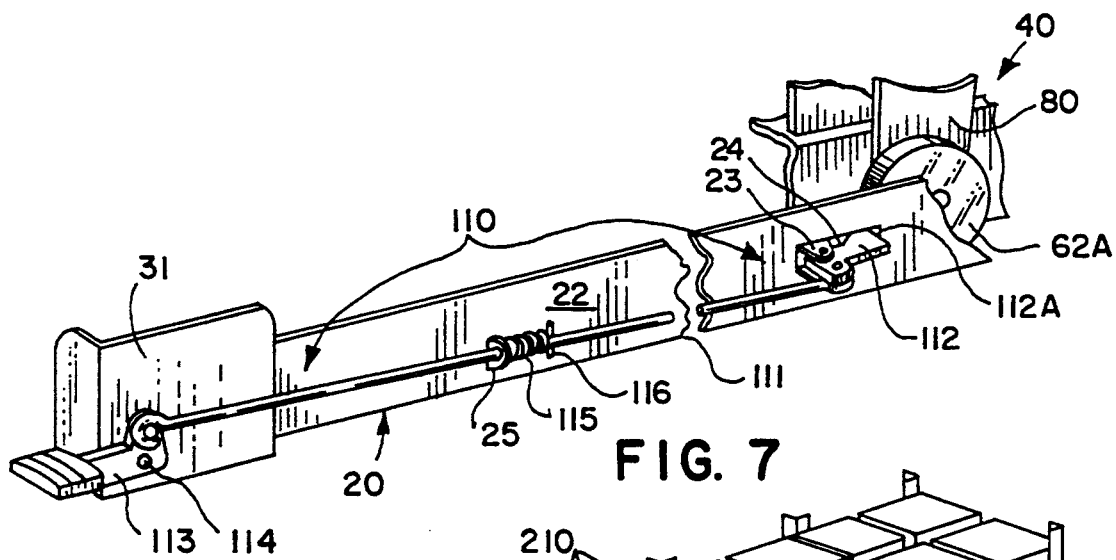
FIG. 7 is a perspective view of a trolley brake and release mechanism which can be used in place of the brake mechanism of FIG. 6.

In an alternative embodiment of the invention, an alternative brake mechanism 110 is substituted for brake mechanism 100. Brake mechanism 110 comprises an elongated rod 111 pivotally connected at one end to a detent 112 and at the other end to a brake or stop release pedal 113 (FIG. 7). Release pedal 113 is pivotally mounted at 114 to frame corner bracket 31. Detent 112 is pivotally mounted to a pair of spaced mounting ears 23 which project laterally from the vertical sidewall 22 of one of the tracks 20. Detent 112 extends through an opening 24 in track sidewall 22 so that it extends in front of a rear wheel 62A on trolley 40, thereby preventing trolley 40 from rolling along the length of track 20.

When release pedal 113 is depressed, rod 111 is pulled forwardly, thereby pivoting detent 112 laterally outwardly relative to track 20, out of the way of rear wheel 62A. Wheels 62 are then free to roll along track 20 and allow trolley 40 to advance from storage position 11 to storage position 12. A spring 115 extends between a laterally projecting tab 25 on rail sidewall 22 and a retainer pin 116 which is secured along the length of rod 111. Spring 115 thereby biases rod 111 rearwardly, and thereby biases detent 112 into its stop position in front of rear wheel 62A. The inside leading edge 112A of detent 112 is preferably angled slightly relative to the path followed by rear wheel 62A such that as trolley 40 is returned to storage position 111, the rear wheel 62A simply pushes detent 112 out of the way as they pass to the rear.

ALTERNATIVE EMBODIMENT WITH FIRST LOAD SUPPORT FIXED AT FIRST TROLLEY STATION

Figure 9:
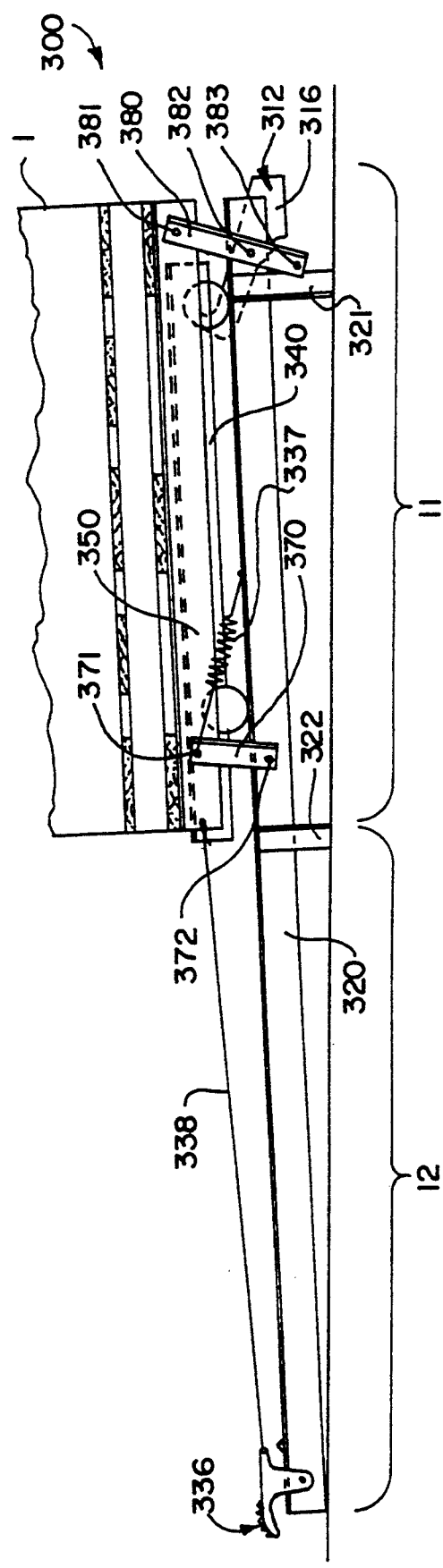
FIG. 9 is a view of an alternative embodiment of the invention in which the first load support is mounted on the trolley track rather than on the trolley as in the FIG. 1 embodiment, and the second load support comprises the trolley itself.
Figure 10:
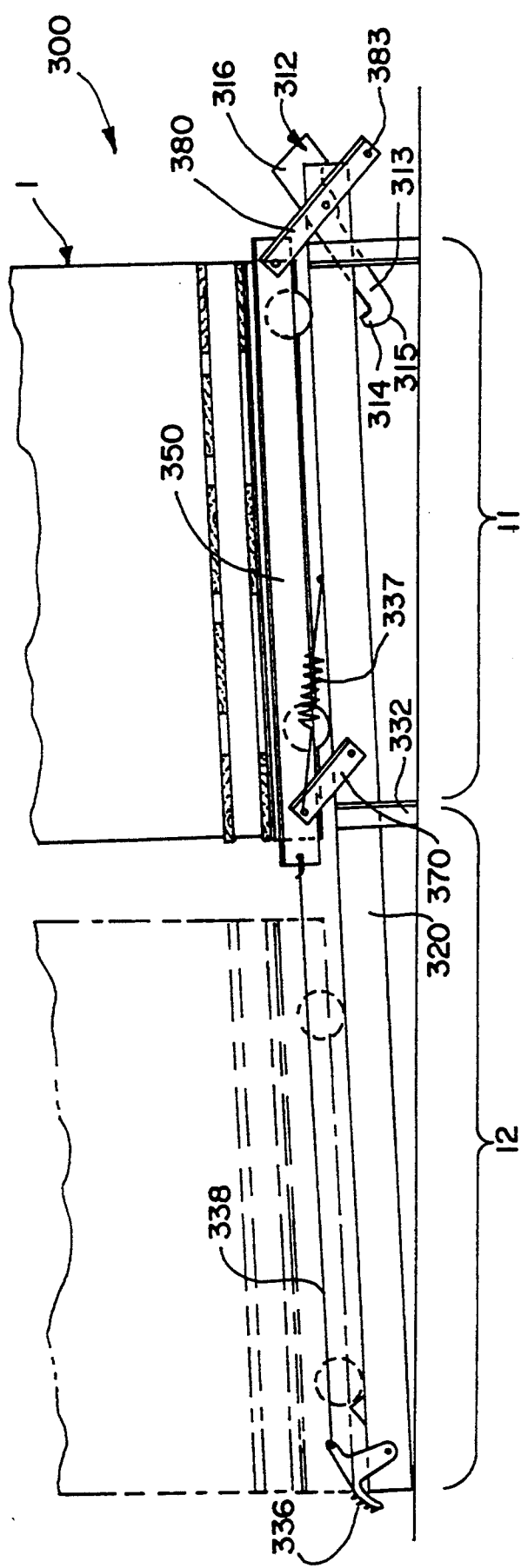
FIG. 10 is the same view as FIG. 9, but showing the second activating means having shifted the first load support into its second vertical position to deposit the load on the trolley, i.e., the second load support, with the trolley also being shown in phantom after it has rolled from the first station to the second station.

In the above embodiments of the invention, first load support frame 50 is mounted to wheel frame 60 which serves as a base for frame 50, by means of over center linkage 70 and a secondary assembly 80. In alternative embodiment 300, first load support frame 350 is joined by an over center linkage 370 and a secondary over center linkage 380 to trolley tracks 320 at first trolley station 11 (FIG. 9). Spring 337 connected between track 20 and linkage 370 serves as a first activating means to bias first load support 350 into a first vertical position which is elevated above the level of trolley 340, which itself comprises a second load support. A second activating means, lever 336, is connected by a cable 338 to first load support 350. By depressing lever 336, first load support 350 is pulled forward against the bias of spring 337 such that the first pivot point 371, which pivotally mounts linkage 370 to first support 350, is shifted forwardly relative to the second pivot point 372, which pivotally interconnects linkage 370 to track 320, thereby shifting the load forward and over center such that it drops down onto trolley 340. Trolley 340 is simultaneously released by a release catch 312 which is interconnected with rear over center linkage 380 such that the now loaded trolley 340 rolls forward along track 320 from first station 11 to second station 12 (compare FIGS. 9 and 10).

Figure 11:
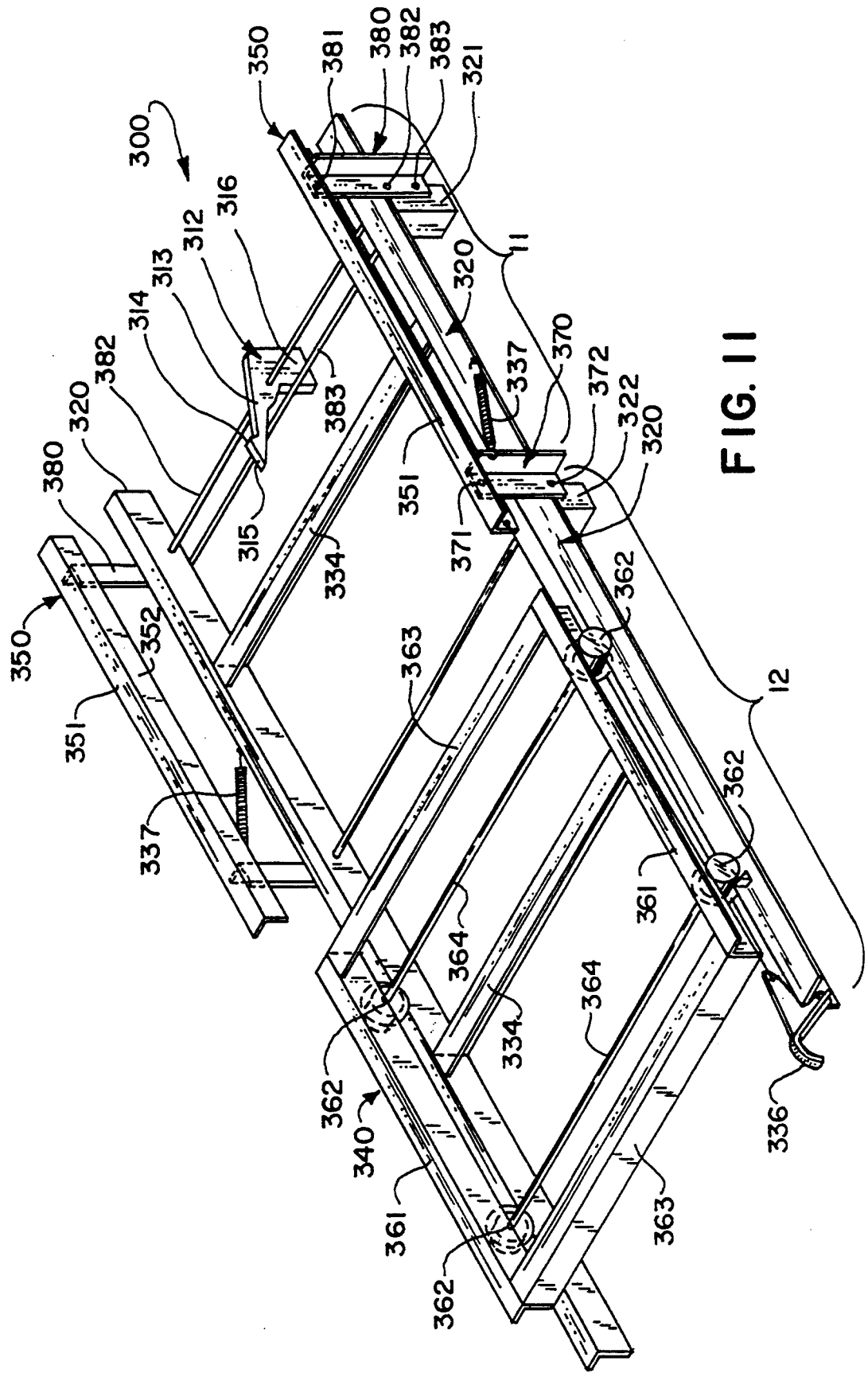
FIG. 11 is a perspective view of said alternative embodiment of the invention with all loads removed.

As in the above first embodiment, tracks 320 are positioned at each side of apparatus 300 and are similarly formed of sturdy angle iron steel (FIG. 11). They are joined to one another by suitable cross braces 334. Other reinforcing structure may be required and its construction is well within ordinary skill in the art. Tracks 320 are supported on each side by rear angle iron legs 321 and intermediate angle iron legs 322, with legs 321 being taller so that tracks 320 slope downwardly from first station 11 to second station 12.

First load support 350 comprises a pair of spaced steel angle iron rails joined by linkages 370 and 380 to track 320 on each side of apparatus 300. Each linkage 370 is pivotally joined by pivot axle 371 to its respective support rail 350 and by a second pivot axle 372 to track 320. Similarly, a rear secondary link 380 on each side of apparatus 300 is pivotally joined at a first pivot point 381 to a first support rail 350 and at a second pivot point 382 to track 320. A cross piece 383 is connected at the bottoms of and extends between each of the secondary linkages 380. Cross piece 383 serves as a stop by engaging the rear of legs 321 and thereby limiting the extent to which biasing spring 337 can draw the upper pivot points 371 and 381 respectively of linkages 370 and 380 rearwardly behind the lower pivots 372 and 382 of those linkages (see FIGS. 9 and 11). In addition, linkages 370 and 380 are themselves short lengths of angle iron and the top edges of the inside legs thereof engage the underside the upper legs 351 of load support rails 350 to serve as stops preventing springs 337 from biasing pivots 371 and 381 any further rearwardly relative to pivots 372 and 382. First support rails 350 are constructed of angle iron steel, each comprising a top wall 351 and a vertical wall 352.

As with support frame 50 of trolley 40, it is preferred that support rails 350 be oriented generally horizontally, rather than inclined at a slight angle, parallel to tracks 320. This may not be absolutely necessary where the angle of inclination of track 320 is slight, but it is a preferred condition.

Trolley 340 in alternative embodiment 300 comprises basically a wheel frame comparable to wheel frame 60 described above. A pair of spaced steel angle frame sides 361 are joined by cross members 363. A pair of wheels 362 are located fore and aft on each frame side member 361. Wheels 362 are joined by wheel axles 364.

Latch 312 catches the rear axle 364 of trolley 340 to hold trolley 340 in position at first station 11 (FIGS. 9 and 11). Latch 312 is pivotally mounted on the pivot axle 382 which extends between secondary linkages 380 on each side of assembly 300 and which serves as the pivot axle for secondary linkages 380. Latch 312 includes a forwardly extending arm 313 which terminates in a slightly upwardly projecting catch 314 which actually embraces and holds rear axle 364 of trolley 340 and a rearwardly extending arm 316, which acts to bias latch. When actuating lever 336 is depressed pulling support rails 350 forwardly, pivot axle 382 is rotated, thereby rotating linkage 380 and causing crosspiece 383 to contact arm 316 of latch 312 and rotating catch 314 and arm 313 downwardly (compare FIGS. 9 and 10), thereby releasing the rear axle 364 of trolley 340 and allowing it to roll forwardly from first station 11 to second station 12.

In operation, load 1 is placed on first load support rails 350 when they are biased into their first or elevated vertical position by first activating means which comprises bias springs 337 (FIG. 9). At this point, trolley 340 will typically be at second station 312 with a load already on it. Once that load is empty, the operator can push trolley 340 back up track 320 and beneath a load 1 placed on load support rails 350, until the rear axle 364 of trolley 340 slides over the tapered leading edge 315 of latch 312 and is then caught by catch 314+to thereby hold trolley 340 in position at first station 11. In alternative embodiments, torsion spring retraction assemblies as described above could be utilized to automatically retract trolley 340 to first station 11 at such time as an empty pallet is removed from the trolley.

With trolley 340 in position at station 11, the operator can then depress the second actuating means 336 which pull first support rails 350 forwardly and pulls linkages 370 and 380 "over center" such that load 1 drops down onto the side rails 361 of trolley 340. This simultaneously pivots latch 312 and releases trolley 340 such that load I is then conveyed to second station 12. Release of actuating lever 336 allows the first actuating means bias spring 337, to retract first support rails 350 into their first vertical position so that they can be reloaded.

THREE STATION ALTERNATIVE EMBODIMENT

The three station alternative embodiment apparatus 400 (FIG. 12) combines the first alternative embodiment trolley 40 with the track mounted load support frames 350 of alternative embodiment apparatus 300. Embodiment 400 is basically the same as embodiment 300 at first station 11 in that first load support rails 350 are mounted on track 320 at first station 11 by means of primary and secondary linkages 370 and 380. Tracks 320 do include upstanding backstops 332 at the end of each track which serve as a stop for trolley 40. The only significant difference between apparatus 400 and apparatus 300 at first station 11 is that linkages 370 and 380 are somewhat longer so that first load supports 350 are elevated higher when in their first, higher vertical stop position. This ensures that they will be higher than the load support rails 51 on trolley 40 when trolley 40 in position at first station 11.

Trolley 40 is basically unchanged from the first embodiment described above, except that a wind-up drum 92 is mounted on rear trolley axle 63 and a torsion spring 94 is wound around rear axle 63 on either side of wind-up drum 92. One end of each torsion spring 94 is fixed to wind-up drum 92 so that it rotates with rear axle 63 and wind-up drum 92, and the other end affixed to wheel frame side member 61 so that it does not rotate with axle 63 and wind-up drum 92. A return cable 93 extends from a rear cross piece such as rear pivot axle 382 and is wound at its other end around wind-up drum 92. As trolley 40 is advanced from first station 11 to second station 12, or even further to third station 12a, cable 93 unwinds and torsion springs 94 tighten to store energy.

Third station 12a is similar in construction to second station 12 of the first embodiment apparatus described above. A pair of spaced load support rails 10 are positioned parallel to and above each track 320 at third station 12a. Rails 10 are steel angle iron rails and are at a level which is below the level of load support rails 50 on trolley 40 when they are in their first elevated position, but above the level of rails 50 when they have been shifted to their second, lower vertical position. Like tracks 20 in the first embodiment of the invention, tracks 320 each include a downwardly inclined ramp 21 near the end of each rail 320 such that as the front wheels 62 of trolley 40 approach the end of rails 320, they roll down inclined ramps 21 while the load support rails 50 are stopped by the end stops 36 on tracks 320, thereby shifting the lower pivot axes of the primary and secondary linkages 70 and 80 on trolley 40 forwardly of the upper pivot axes thereof and causing load support rails 50 to drop down below the level of load support rails 10.

One of the trolley tracks 320 is equipped with a stop 412 at the front of second trolley station 12. Stop 412 projects upwardly through an opening in track 320 in the path of the leading wheel 62 on trolley 40. Thus, as trolley 40 rolls down tracks 320, the lead wheel 62 on one side engages stop 412 and prevents trolley 40 from advancing past second station 12. Stop 412 is itself a "lazy L" shaped member, the leg of which extends to and is connected to the end of bell crank 416 mounted on one of the vertical supports 14A for load support rails 10. The other end of bell crank 416 is connected by a cable 414 to an actuating pedal 413. It is also connected to a bias spring 415, the other end of which is attached to track 320 such that it biases bell crank 416 and foot pedal 413 into the positions shown in FIG. 12, such that stop 412 is projecting upwardly through the opening in track 320 and into the path of trolley wheel 62. In order to release trolley 40 from the second station 12, the operator depresses foot pedal 413, pulling bell crank 416 forwardly against the bias of spring 415 and pivoting stop lever 412 downwardly, out of the way of trolley wheel 62. This allows trolley 40 to advance to the third station 12a of apparatus 400.

In operation, a user places a first load on first load supports 350 at station 11. If trolley 40 is empty, it will have automatically returned to station 11 and will be in position beneath first load supports 350. The operator can transfer the load from load supports 350 to load supports 50 on trolley 40 by depressing lever 336. As described above, this pulls first load supports 350 forwardly against the bias of spring 337. It also pulls the upper pivot points 371 and 381 of linkages 370 and 380, respectively, forwardly of their respective lower pivot points 372 and 382. This movement over center allows the load on support rails 350 to drop down onto support rails 50 on trolley 40.

The weight on trolley 40 overcomes the bias of torsion springs 94 and causes trolley 40 to advance along tracks 320. That advancement continues until trolley 40 engages stop 412.

With the first load thus located at second station 12 on trolley 40, another load can be placed on first support rails 350 at first station 11. Further, if there is then no load at third station 12a on support rails 10, the operator can depress foot pedal 413, pivoting stop 412 downwardly and allowing trolley 40 to roll forwardly to third station 12a. As it does so, the leading edges of support rails 51 will abut track end stops 36, thereby stopping the advancement of support rails 51. Leading trolley wheels 62, on the other hand, will now be at inclined ramps 21 and will roll down those ramps thereby shifting linkages 70 and 80 over center and causing the load on support rails 51 to drop down onto support rails 10. With trolley 40 thus unweighted, the energy stored in torsion springs 94 will cause rear axle 63 and wind-up drum 92 to rotate, thus winding up cable 93 and pulling trolley 40 from third station 12a all the way back to first station 11.

At first station 11, the rear ends of load support rails 50 will engage rear stops 332 while the continuing wind-up of cable 93 on rewind drum 92 will pull wheel frame 60 rearwardly still further, such that linkages 70 and 80 will again pivot over center the other way, elevating load support frame 50 and load support rails 51 into their elevated position, which is still just below the level of first load support rails 350.

The operator can now advance the load which is on first support rails 350 forwardly to second station 12 by depressing lever 336, pulling first load support 350 forwardly and pivoting linkages 370 and 380 over center to cause the load to drop down onto load support frame 50 of trolley 40. The thus loaded trolley 40 will again then advance to second station 12 where one of its leading wheels 62 will engage stop 412. With first station 11 thus unloaded, the operator can now place another load on first support rails 350, which will have been biased back into their elevated vertical position by activating spring 337.

At this point, there will be a loaded pallet at first station 11 on elevated support rails 350, a loaded pallet at station 12 on load support frame 50 of trolley 40, and a loaded pallet at the third station 12a on load support rails 10. The operator can now empty the load from third station 12a, call for another load by depressing pedal 413 and advancing trolley 40 and then repeat the foregoing operations sequentially to continue to remove loads from first station 11 to second station 12 and the like.

Figure 12:
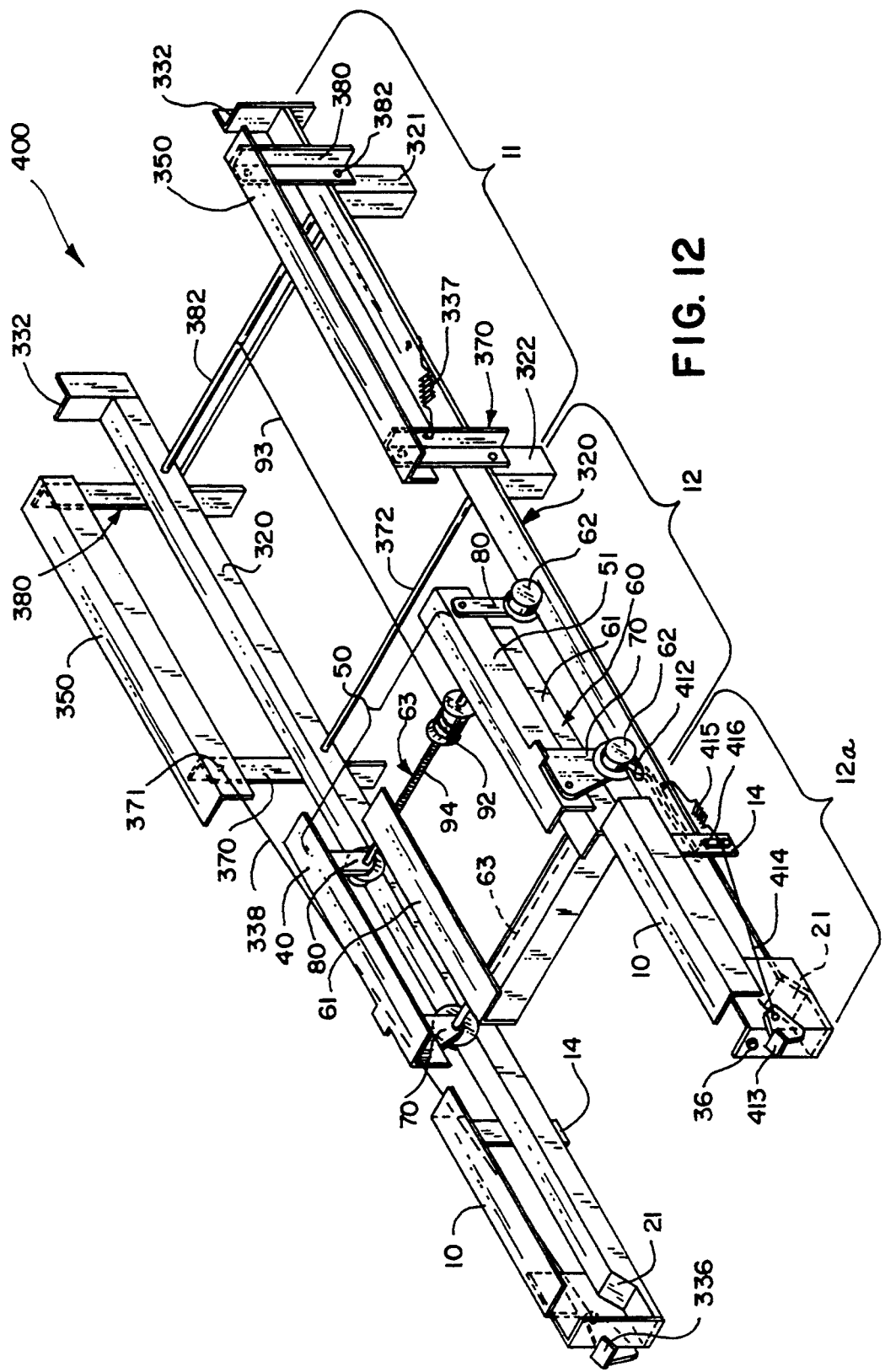
FIG. 12 discloses a three station alternative embodiment of the present invention in which both of the above variations of the preferred embodiment are utilized.

It will be appreciated that since the various components of alternative embodiment 400 have been described in connection with earlier embodiments, some of the more mundane features such as cross braces and the like have been left out of FIG. 12 and have not been described above. It will be appreciated by those skilled in the art that such additional reinforcing and bracing structure may be required.

CONCLUSION

It is understood that the above are merely preferred embodiments of the invention. The foregoing are deemed to comprise the best mode contemplated by the inventor, though which embodiment is the best mode for a particular application will, of course, vary as a function of the application. It is understood that various changes and alterations can be made without departing from the spirit and broader aspects of the invention as set forth in the appended claims which are to be interpreted in accordance with the principles of patent law, including the doctrine of equivalents.

The embodiment of the invention in which an exclusive property or privilege is claimed are defined as follows.

1. A device for advancing loads from a first station to a second station comprising:
   a track extending from said first station to said second station;
   a trolley movable on said track between said first and second stations, said trolley comprising a wheel frame including wheels to facilitate movement of said trolley;

a load support mounted on said track at said first station by an over center linkage pivotally joined at a first pivot point to said load support and at a second pivot point to said track, said first and second pivot points shifting fore and aft relative to one another in response to first and second activating means;

said linkage being movable over center to shift said load support between first and second vertical positions relative to said track, said load support projecting above said trolley in said first vertical position and below said trolley in said second vertical positions;

said first activating means configured for shifting said load support into said first vertical position and said second activating means configured for shifting said load support into said second vertical position;

said first activating means operating on said load support at said first station;

said second activating means operating on said load support at said first station whereby said trolley can be moved from said second station to said first station below a load placed on said load support at said first station with said load support in said first vertical position; and said second activating means activatable to lower said load support into said second vertical position and thereby transfer a load supported on said load support onto said trolley, said trolley can be moved from said first station to said second station to thereby convey said load to said second station and said first activating means can then shift said load support back into said first vertical position.

2. The device of claim 1 which includes means for moving said trolley from said second station rearwardly to said first station comprising a spring loaded return wherein the force of said spring loaded return is insufficient to prevent said trolley from moving from said first station to said second station when a load is placed thereon, but is sufficiently strong to return said trolley from said second station to said first station after the load has been removed, whereby return of said trolley from said second station to said first station is effected automatically.

3. The device of claim 2 including releasable detent means for holding said trolley in said first station under the weight of a load placed thereon, said releasable detent means being releasable whereby said trolley is free to move to said second station.

4. The device of claim 3 in which said spring loaded return comprises a rotatable axle fixedly positioned at said first station, a cable drum mounted on said rotatable axle and a cable secured at one end to said trolley and being wound on said cable drum; and said spring loaded return comprising a torsion spring coiled around said axle and having one end fixed and the other end operably connected to said cable drum whereby as said trolley moves from said first station to said second station, said cable unwinds from said cable drum and said torsion spring tightens such that when a load is removed from said trolley at said second station, the tightened torsion spring begins to uncoil and rewind said cable over said cable drum to thereby return said trolley to said first station.

5. The device of claim 1 in which said track is sloped downwardly from said first station to said second station whereby gravity induces said trolley to roll down said track from said first station to said second station.

6. The device of claim 5 which includes means for moving said trolley from said second station rearwardly to said first station comprising a spring loaded return wherein the force of said spring loaded return is insufficient to prevent said trolley from moving from said first station to said second station when a load is placed thereon, but is sufficiently strong to return said trolley from said second station to said first station after the load has been removed, whereby return of said trolley from said second station to said first station is effected automatically.

7. The device of claim 6 including releasable detent means for holding said trolley in said first position under the width of a load placed thereon, said releasable detent means begin releasable whereby said trolley is free to move to said second station.

8. The device of claim 1 in which said first activating means, comprises means biasing said over center linkage into a first position such that said load support is located in said first vertical position at a level above said trolley; and said second activating means comprising advancing means for advancing said first pivot point forwardly of said second pivot point to thereby overcome said bias means and allow a load placed on said load support to descend onto said trolley.

9. The device of claim 8 which includes a releasable catch for said trolley at said first station whereby said trolley can be held in position at said first station beneath said load support means; and said catch being releasable whereby said trolley can be advanced from said first station to said second station.

10. The device of claim 9 in which said track is sloped downwardly from said first station to said second station whereby gravity induces said trolley to roll down said track from said first station to said second station.

11. The device of claim 10 which includes means for moving said trolley rearwardly from said second station to said first station whereby another load can be placed on said trolley at said first station.

12. The device of claim 11 in which said means for moving said trolley from said second station rearwardly to said first station comprises a spring loaded return wherein the force of said spring loaded return is insufficient to prevent said trolley from moving from said first station to said second station when a load is placed thereon, but is sufficiently strong to return said trolley from said second station to said first station after its load has been removed, whereby return of said trolley from said second station to said first station is effected automatically.

13. The device of claim 12 in which said spring loaded return comprises a rotatable axle positioned on said first station, a cable drum mounted on said rotatable axle and a cable secured at one end to said trolley and being wound on said cable drum; and a torsion spring coiled around said axle and having one end fixed and the other end operably connected to said cable drum whereby as said trolley moves from said first station to said second station, said cable unwinds from said cable drum and said torsion spring tightens such that when a load is removed from said trolley at said second station, the tightened coil spring begins to uncoil and rewind said cable over said cable drum to thereby return said trolley to said first station.

14. The device of claim 8 in which said track is sloped downwardly from said first station to said second station whereby gravity induces said trolley to roll down said track from said first station to said second station.

15. The device of claim 14 which includes means for moving said trolley rearwardly from said second station to said first station whereby another load can be placed on said trolley at said first station.

16. The device of claim 15 in which said means for moving said trolley from said second station rearwardly to said first station comprises a spring loaded return wherein the force of said spring loaded return is insufficient to prevent said trolley from moving from said first station to said second station when a load is placed thereon, but is sufficiently strong to return said trolley from said second station to said first station after its load has been removed, whereby return of said trolley from said second station to said first station is effected automatically.

17. The device of claim 16 in which said spring loaded return comprises a rotatable axle positioned on said first station, a cable drum mounted on said rotatable axle and a cable secured at one end to said trolley and being wound on said cable drum; and a torsion spring coiled around said axle and having one end fixed and the other end operably connected to said cable drum whereby as said trolley moves from said first station to said second station, said cable unwinds from said cable drum and said torsion spring tightens such that when a load is removed from said trolley at said second station, the tightened coil spring begins to uncoil and rewind said cable over said cable drum to thereby return said trolley to said first station.

18. A device for advancing loads from a first station to a second station, comprising:

an inclined track extending from the first station to the second station;

a trolley movable on said track between said first and second stations under the force of gravity;

a first load support mounted on said track at the first station by a first linkage pivotally joined at a first pivot point to said first load support and at a second pivot point to said track, said first linkage movable to shift said first load support between first and second vertical positions relative to said track, said first load support disposed above said trolley in said first vertical position and disposed below said trolley in said second vertical position; and a first and second activating means for shifting said first and second pivot points fore and aft relative to one another, said first activating means configured for shifting said first load support into said first vertical position and said second activating means configured for shifting said first load support into said second vertical position and thereby transfer a load supported on said first load support onto said trolley.

19. The device of claim 18, further including:

a second load support mounted on said trolley by a second linkage pivotally joined at a first pivot point to said second load support and at a second pivot point to said trolley;

a third load support mounted on said track at said second station;

said second linkage movable to shift said second load support between first and second vertical positions relative to said track, said second load support disposed above said third load support in said first vertical position and disposed below said third load support in said second vertical position.

20. The device of claim 18 which includes means for moving said trolley rearwardly from said second station to said first station whereby another load can be placed on said trolley at said first station.

21. The device of claim 20 which includes means for moving said trolley from said second station rearwardly to said first station comprising a spring loaded return wherein the force of said spring loaded return is insufficient to prevent said trolley from moving from said first station to said second station when a load is placed thereon, but is sufficiently strong to return said trolley from said second station to said first station after its load has been removed, whereby return of said trolley from said second station to said first station is effected automatically.

22. The device of claim 21 in which said spring loaded return comprises a rotatable axle positioned on said first station, a cable drum mounted on said rotatable axle and a cable secured at one end to said trolley and being wound on said cable drum; and a torsion spring coiled around said axle and having one end fixed and the other end operably connected to said cable drum whereby as said trolley moves from said first station to said second station, said cable unwinds from said cable drum and said torsion spring tightens such that when a load is deposited from said trolley at said second station, the tightened coil spring begins to uncoil and rewind said cable over said cable drum to thereby return said trolley to said first station.

23. The device of claim 22 including releasable detent means for holding said trolley in said first station under the weight of a load placed thereon, said releasable detent means being releasable whereby said trolley is free to move to said second station.

24. The device of claim 18 including releasable detent means for holding said trolley in said first station under the weight of a load placed thereon, said releasable detent means being releasable whereby said trolley is free to move to said second station.

* * * * *

UNITED STATES PATENT AND TRADEMARK OFFICE
CERTIFICATE OF CORRECTION

PATENT NO. : 5,350,270
DATED : September 27, 1994
INVENTOR(S) : Stallard, et al

It is certified that error appears in the above-indentified patent and that said Letters Patent is hereby corrected as shown below:

Col. 8, line 15;
        After "catch 314" delete --+--.

Col. 8, line 27;
        "load I" should be --load 1--.

Col. 8, line 50;
        After "trolley 40" (second occurrence) insert --is--.

Col. 12, line 18;
        "width" should be --weight--.

Col. 14, line 21;
        "20 which includes" should be --20 in which said--.

Col. 14, line 23;
        "comprising" should be --comprises--.

UNITED STATES PATENT AND TRADEMARK OFFICE
CERTIFICATE OF CORRECTION

PATENT NO. : 5,350,270
DATED : September 27, 1994
INVENTOR(S) : Stallard et al.

It is certified that error appears in the above-indentified patent and that said Letters Patent is hereby corrected as shown below:

Col. 14, line 43;
"from said" should be --by said--

Col. 14, line 48;
"trolley in" should be --trolley at--.

Col. 14, line 53;
"trolley in" should be --trolley at--.

Signed and Sealed this

Sixth Day of June, 1995

Attest:

BRUCE LEHMAN

*Attesting Officer*  *Commissioner of Patents and Trademarks*